United States Patent
Schmitt et al.

(10) Patent No.: US 6,981,226 B2
(45) Date of Patent: *Dec. 27, 2005

(54) FLOWCHART PROGRAMMING FOR INDUSTRIAL CONTROLLERS, IN PARTICULAR MOTION CONTROLLERS

(75) Inventors: Regina Schmitt, Erlangen (DE); Peter Wagner, Hersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 585 days.

This patent is subject to a terminal disclaimer.

(21) Appl. No.: 09/911,585

(22) Filed: Jul. 24, 2001

(65) Prior Publication Data

US 2002/0054098 A1 May 9, 2002

(30) Foreign Application Priority Data

Aug. 7, 2000 (DE) ......................... 100 38 440
Aug. 7, 2000 (DE) ......................... 100 38 439
Aug. 7, 2000 (DE) ......................... 100 38 441

(51) Int. Cl.$^7$ ............................................. G09G 5/00
(52) U.S. Cl. ................. 715/764; 715/762; 715/771; 715/965; 700/83; 700/86; 717/106; 717/109; 717/120; 717/100
(58) Field of Search ................. 345/762–764, 345/771, 835, 965, 967; 700/83, 86–87; 717/106, 109, 100, 113, 120, 121, 110

(56) References Cited

U.S. PATENT DOCUMENTS

| | | | |
|---|---|---|---|
| 3,668,653 A | * | 6/1972 | Fair et al. ................. 700/1 |
| 4,074,281 A | * | 2/1978 | Quarton ................. 347/226 |
| 4,646,228 A | | 2/1987 | Ikeda |
| 4,852,047 A | * | 7/1989 | Lavallee et al. ............. 700/86 |
| 4,858,101 A | | 8/1989 | Stewart et al. |
| 5,321,603 A | | 6/1994 | Schwenke |
| 5,392,207 A | | 2/1995 | Wilson et al. |
| 5,434,489 A | | 7/1995 | Cheng et al. |

(Continued)

FOREIGN PATENT DOCUMENTS

| | | |
|---|---|---|
| DE | 196 00 882 C1 | 9/1997 |
| EP | 0 383 506 B1 | 8/1990 |
| EP | 0531653 A2 | 3/1993 |
| EP | 0 774 701 A1 | 11/1995 |
| EP | 0 735 444 A2 | 3/1996 |
| EP | 0 813 131 A1 | 6/1997 |
| WO | WO 92/02871 | 2/1992 |
| WO | WO 97/25661 | 7/1997 |

OTHER PUBLICATIONS

Hans B. Kief, NC/CNC Handbuch, 1995, Forward and pp. 296–297 and 318–319, Carl Hanser Verlag Publishers, Munich, Germany.

Josef Hubl, SPS/IPC/Drives–tagungsband, pp. 88–95, Nov. 23–25, 1999, Nurnberg, Verlag Huthig GmbH, Heidelberg, Germany.

DIN Standard 66001, Information Processing: Graphical Symbols and their Applications, Dec. 1983 (English Translation).

Search Report for EP 01 11 8071.

Beiblatt 1 zu Din En 61131–3, Speicherprogrammierbare Steuerungen, Nov. 1997, Beuth Verlag, Berlin, Germany, pp. 1–55.

*Primary Examiner*—Raymond J. Bayerl
*Assistant Examiner*—Cuong T. Thai

(57) ABSTRACT

A method for graphical programming of industrial controllers, in particular motion controllers, that automatically generates suitable graphical elements and respective masks in motion control flowchart notation from user-defined structured text subprograms of a structured textual language.

21 Claims, 8 Drawing Sheets

U.S. PATENT DOCUMENTS

| | | |
|---|---|---|
| 5,485,620 A | 1/1996 | Sadre et al. |
| 5,504,902 A | 4/1996 | McGrath et al. |
| 5,508,909 A | 4/1996 | Maxwell et al. |
| 5,801,942 A | 9/1998 | Nixon et al. |
| 6,144,984 A * | 11/2000 | DeBenedictis et al. ..... 718/106 |
| 6,263,487 B1 * | 7/2001 | Stripf et al. ................ 717/171 |
| 6,282,699 B1 * | 8/2001 | Zhang et al. ................ 717/109 |
| 6,289,252 B1 * | 9/2001 | Wilson et al. ................. 700/7 |
| 6,442,442 B1 * | 8/2002 | Weinhofer ................... 700/86 |
| 6,466,827 B1 * | 10/2002 | Stine ........................... 700/18 |
| 6,553,268 B1 * | 4/2003 | Schwenke et al. ........... 700/18 |
| 6,571,138 B1 | 5/2003 | Okada et al. |

* cited by examiner

FLOWCHART PROGRAMMING FOR INDUSTRIAL CONTROLLERS, IN PARTICULAR MOTION CONTROLLERS

FIELD OF THE INVENTION

This invention relates to a method for programming industrial controllers, in particular motion controllers, where the user links graphical elements, in particular control structures and function blocks, with a graphical editor to form a flowchart that can be visualized on a display device.

BACKGROUND

In the industrial environment, it is known that graphical input aids and a display screen can be used for visualizing the control of the motion of a processing machine or a production machine (Hans D. Kief: NC/CNC Handbuch 2000 [NC/CNC Handbook 2000], Hansa Verlag, p. 254, FIG. 7 and p. 327, FIG. 6). The basic elements of graphical structure diagrams and flowcharts are defined in German Industrial Standard DIN 66,001.

In addition, it is stated in the article "Visual Languages—an Inexorable Trend in Industry" (Josef Hübl, PLCs/IPCs/Drives—Convention Volume, pp. 88–95, Nov. 23–25, 1999, Nuremberg, Verlag, Hüthig GmbH, Heidelberg) that control flowcharts and data-flow diagrams for control of automation functions may be created with the help of graphical editors.

The graphical input means and graphical editors available today for programming industrial controllers do not provide adequate support with regard to adaptive mechanisms for the hardware configuration on which an application is based. In the graphical editor, the user is solely provided with a rigid and restricted supply of programming language commands.

In addition, the graphical input means and graphical editors available today for programming industrial controllers, support either dedicated programming to control an industrial process programmable controller (PLC) function, or programming the motion controller of a processing machine or production machine. Creation of programs for both fields of applications is not adequately supported by the existing flowchart editors.

Another disadvantage of the flowchart editors used today for programming industrial automation functions is that the diagrams created with these editors are either converted directly to executable processor code or to ASCII code, and must subsequently be interpreted in the respective target system through a run time-intensive process. This system is not just inflexible with regard to porting and transfer of programs to other systems or machines, but does also restrict the user's debugging options.

Additional disadvantages of existing flowchart editors include the fact that only a limited, rigid and inflexible library of icons is available, and that the processing sequence of icons and the corresponding function blocks is predetermined. Further, existing flowchart editors frequently offer only a limited number of possibilities for formulating synchronization mechanisms, although such mechanisms are frequently required, in particular for programming applications in industrial automation.

SUMMARY OF THE INVENTION

Therefore, the object of this invention is to create a method whereby a library of graphical elements, that include suitable function interfaces appropriate for the respective underlying hardware configuration, is made available to a user through adaptive mechanisms, so that technology-specific features of the flowchart editor are available to the user.

According to this invention, this object is achieved for a method of the type defined above in that additional graphical elements containing the function interface of corresponding subprograms are also made available to the user. The elements are generated automatically in the flowchart view by a converter in the manner of a converter from user-defined subprograms of a textual language. This enables the system manufacturer to generate icons and the respective masks automatically, and to make them available to the user in the flowchart editor from existing subprograms of the textual language, or from additional subprograms that might be introduced by the machine manufacturer into the textual language. The function interfaces and the transfer parameters of the subprograms of the textual language are thereby generated automatically for the flowchart icons. Due to these mechanisms, original equipment manufacturers may transfer subprograms that are already prepared in textual language into the flowchart editor. Thus, an adapted and expanded library of icons is made available to the end user for flowchart programming.

For manufacturers and distributors of flowchart editors for programming of industrial controllers, this also yields the advantage that they can provide the flowchart editor with a basic supply of graphical language elements, which may then be adapted to the demands of the user as a function of any existing subprograms of the textual language. A flowchart editor can, thus, be supplied to customers in an adaptable standard version or basic version (providing economies of scale). For the user, this yields the possibility of technological scaling for his respective applications with respect to the available library of graphical elements.

In a first advantageous embodiment of the present invention, the following steps are carried out:

a) generating a textual language from the flowchart, b) converting the textual language in a processor-independent pseudo-code, c) loading the processor-independent pseudo-code into the controller, d) converting the processor-independent pseudo-code into executable processor code.

That a textual language is generated from the flowchart diagrams in an intermediate step provides the user the option of performing plausibility checks already at this level of the textual language. However, the user can also tie other language elements, already present in the textual language, to the application. Due to the fact that the textual language is converted in a processor-independent pseudo-code in another intermediate step, the aforementioned flexibility for the user is largely retained. The user can also perform plausibility checks or debugging at this pseudo-code level. The processor code that ultimately runs in the controller is generated from the processor-independent pseudo-code, so the target of the application is not specified until a later point in time. Furthermore, different target hardware units can easily be operated due to the intermediate steps in the generation of the code.

Another advantage of this invention is that adequate programming language commands are made available for the user in the flowchart editor for each basic machine design and/or hardware configuration. This provides a programming environment that is adapted to the basic hardware and, thus, meets the existing requirements and boundary conditions in an optimal manner. The library of icons of the flowchart editor will be automatically adapted to the given hardware specifications, e.g., the basic machine configuration.

In another advantageous embodiment of this invention, the automatically generated graphical elements may be used as language elements of the flowchart. This increases the library of flowchart elements available to the user, i.e., icons, due to the fact that these automatically generated icons can be used as normal language elements of the flowchart editor. It also increases the user's flexibility and ease of expression with regard to programming of applications.

In another advantageous embodiment of this invention, the textual language is "structured text" according to the international standard IEC 6-1131 (International Electrotechnical Commission, 1992, Programmable controllers—Part 1: General information, IEC 61131-1, standard published by International Electrotechnical Commission). Due to the fact that IEC 6-1131 is a standardized language at the level of the textual language, it is readily possible to exchange it or combine it with other programming systems. In addition, when IEC 6-1131 is used as an intermediate language, it becomes easier to port to different target systems.

In another advantageous embodiment of this invention a user can transition between textual language, the contact plan and/or the function plan as forms of representation for expressing conditions as desired, since IEC 6-1131 is used as textual language on the structured text level. This provides increased flexibility for the user and is an advantage in particular for formulating conditions, because the user can select the form of representation or description in which he or she is most experienced or which is most appropriate to the underlying problem. A user will generally use contact plans and/or function plans for representing binary links and structured text for formulating arithmetic calculations.

In another advantageous embodiment of the present invention, at least one loop and/or at least one parallel branch may be used as a language element in the flowchart view. In the flowchart editors conventionally used today, loops and frequently also branches are represented with the help of jump marks. However, due to the use of jumps and the respective targets marks, the program design may become complicated and difficult to reproduce (a "Go To problem"). Due to the fact that loops and parallel branches are available to the user as separate language elements, it becomes easier to develop and read the programs.

In another advantageous embodiment of the present invention, the individual commands are started in the same interpolator cycle within the respective parallel branch. Due to the fact that all the branches of the parallel branch language function are operated in the same interpolator cycle, it is possible to perform quasi-parallel processing of the commands contained in the individual branches of a parallel branch construct. In addition to sequential processing, therefore, parallel processing of commands is also made possible and is supported by adequate programming language commands in the programming environment for the user.

In another advantageous embodiment of the present invention, the parameters for function blocks may be set by mask input in the flowchart view. Thus, the user may set parameters in a way that is simple and easy to understand. For each type of function block there are standard masks, which only allow a user to make the parameter inputs that are possible for the current type. The risk of defective inputs is reduced by this context sensitivity.

In another advantageous embodiment of the present invention, function blocks are combined into modules in the flowchart view. These modules also appear as function blocks. This increases the simplicity of program execution in the flowchart for the user. A user can combine function blocks that belong together logically into one module, and can encapsulate them there, in which case this module also appears as a function block in the flowchart editor, that is, as an icon. However, this mechanism of combining and encapsulation does not merely make it simpler to run the program, but also allows for the program to be structured in this way.

In another advantageous embodiment of the present invention, modules are interleaved in the flowchart view. This means that a module may contain one or more modules as an element. Modules may subsequently be used as "subprograms" in other modules, thereby, increasing the simplicity and structure of the program execution in the flowchart.

In another advantageous embodiment of the present invention, the user may employ multiple instructions in the function blocks for the allocation of variables in the flowchart view. The user can enter multiple variable instructions in succession into one function block, that is, into one icon, and does not need a new function block for each variable instruction. The user can also perform variable instructions, which logically belong to this function block, bundled in this one function block, which increases comprehensibility and supports the programming principle of high cohesion.

In another advantageous embodiment of the present invention, the function blocks representing the functions that require a certain amount of time contain progression conditions in the flowchart view. Functions that claim a period of time include, for example, an approach to reference points, acceleration or axial positioning. Such functions and their interaction can be synchronized by the user with the help of the progression conditions. Thus, with the help of the progression conditions, a user has access to a synchronization mechanism that allows synchronized complex motions and relationships among multiple axes.

In another advantageous embodiment of the present invention, the graphical elements of the flowchart are automatically positioned. When a user wants to represent a new icon in the flowchart editor, it is automatically positioned at the point that is the next, in order to correspond to the logical program sequence. This increases the user's efficiency, since one does not have to position the icons that one has generated.

In another advantageous embodiment of the present invention, the icons of the flowchart are automatically linked together. This also increases the operating efficiency of the user because the icons need not be linked together manually.

In another advantageous embodiment of the present invention, the flowchart may be shown in a reduced or enlarged form in the display. Due to this zoom function, the diagrams are easier to comprehend for the user, and furthermore, when the user is interested in certain program sequences, he can emphasize them graphicalally by enlarging them.

In another advantageous embodiment of the present invention, retranslation back into flowchart representation is possible because of markings in the textual language. Due to the use of syntactical and geometric information in the form of markings, it is possible to perform such reverse translation from the textual language into the flowchart view. The reverse translation option has the advantage for the user that changes entered at the level of the textual language can be implemented directly in the flowchart view through the flowchart editor and then become visible for the user in the flowchart diagrams. The user can then further process such retranslated programs with the help of the flowchart editor on the graphical level, and can subsequently generate control code from the said reconverted programs in the remaining procedure.

The main advantages achieved with this invention, thus, consist of the fact that icons for the flowchart editor, containing the function interface of the corresponding subprograms, are automatically generated from subprograms in textual language. If an original equipment manufacturer has already created subprograms in textual language, these subprograms can automatically expand the library of the flowchart editor with appropriate icons.

Another advantage is that a user can program both motion control functions and process control functions (programmable controller functions) in an appropriate form in a uniform programming environment. In addition, it is advantageous that the programming environment is project-sensitive, i.e., that additional dedicated language elements are made available to the user, depending on the underlying hardware or machine design.

Another advantage is that the user may use sequential as well as cyclic programming of control sequences. Since the user has access to interleaved module formation of function blocks he or she may simplify and improve the structure of his programs, because the design criteria, locality and high cohesion are easily implemented.

BRIEF DESCRIPTION OF THE FIGURES

An embodiment of this invention is illustrated in the drawings and explained in greater detail below.

DETAILED DESCRIPTION OF THE INVENTION

Figure 1:
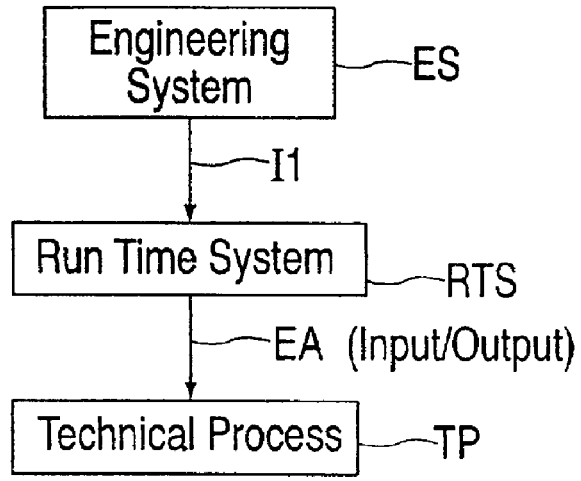
FIG. 1 shows an engineering system, the respective run time system and the technical process to be controlled in a schematic diagram.

In FIG. 1, a block diagram shows that a technical process TP is controlled by the run time system RTS of an industrial controller. The connection between the run time system RTS and the controller, and the technical process TP, is bi-directional over the input/output EA. Programming of the controller and, thus, the specification of the behavior of the run time system RTS takes place in the engineering system ES. The engineering system ES contains tools for configuring, designing and programming machines, and for the control of technical processes. The programs generated in the engineering system are sent to the run time system RTS of the controller over information path I1. With regard to its hardware equipment, an engineering system ES usually comprises of a computer system with a graphical display screen (e.g., a video display unit), input means (e.g., a keyboard and mouse), a processor, working memory and secondary memory, a device for accommodating computer readable media (e.g., diskettes, CDs) and connection units for data exchange with other systems (e.g., other computer systems, controllers for technical processes) or media (e.g., the Internet). A controller usually comprises input and output units as well as a processor and program memory.

Figure 2:
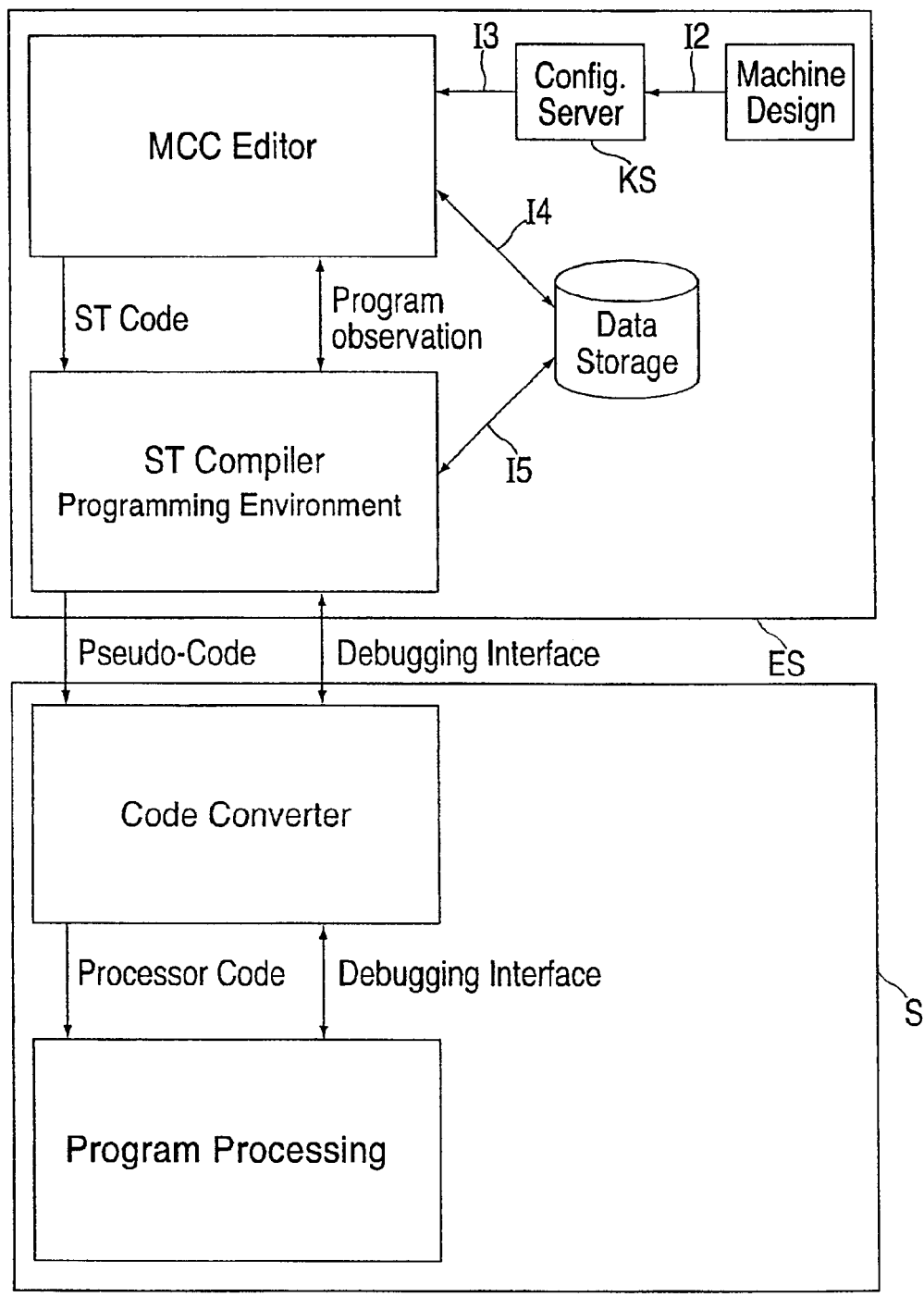
FIG. 2 shows elements of the engineering system and the controller and their interrelationships in a survey diagram.

In FIG. 2, elements of the engineering system and the controller and their interaction are illustrated in the form of a survey diagram, where the individual elements are represented in the form of rectangles, and the data storage contained in the engineering system is represented in the form of a cylinder. Arrows (unidirectional or bidirectional) indicate the logical relationships among the elements in terms of data and sequence. The top half of FIG. 2 shows the elements of the engineering system, namely, the motion control chart (MCC) editor, the structured text (ST) compiler with programming environment, the configuration server KS and the machine design as well as a data storage. The fact that these elements belong to the engineering system is indicated by the border around them. The controller contains the code converter and program processing. The elements of the controller, which are in the lower section in FIG. 2, are outlined. Both the engineering system and the controller may also contain other elements, but, for simplicity, these are not shown.

The graphical program sequences are generated in the MCC editor. The language elements of the editor, i.e., the icons, can be generated and represented by means of a command bar on the display screen, which is operated with the help of a mouse or other possible input means. With the help of the MCC editor, a user can link function blocks (icons) and control structures to form a flowchart, that is, the MCC editor can be used as a graphical programming tool for generating programs for motion controls and/or process controls. A text program and a textual language (usually structured text according to IEC 6-1131) are generated from the flowchart. This structured text code (ST code) is converted by the structured text converter (ST compiler), which is part of the programming environment in a processor-independent pseudo-code. This pseudo-code is loaded onto the controller where it is converted to executable processor code by the code converter. This process code is executed by the program processor within the controller. The unidirectional arrows in the left section of FIG. 2 represent the steps in code conversion or program conversion. In parallel with the three unidirectional arrows running from top to bottom representing this conversion, three bi-directional arrows, representing debugging interfaces and the possibility of program observation, run between the following elements: the MCC editor, the ST compiler, the code converter and the program processing. Between the program processing and code converter is a debugging interface on the processor code level, i.e., on the object code level, and another debugging interface is placed between the code converter and the ST compiler. This debugging interface is on the pseudo-code level. Between the ST compiler and the MCC editor there is another debugging interface or program observation interface at the structured text level (ST code).

As additional elements of the engineering system, FIG. 2 shows the machine design and a configuration server KS. In the machine design, the design of the hardware or the underlying machine is completed with the help of suitable tools, in other words, e.g. the types of axes present and the quantity specified in the machine design. This information is fed into the MCC editor through the configuration server KS. The transfer of this information is represented by the unidirectional arrows 12 and 13. In addition, the configuration server KS also contains other relevant configuration information for the system, which can also be used, for example, for licensing the respective software components.

The data storage DA, represented by a cylinder, contains three things: first, the object model generated by the MCC editor for a flowchart; second, the respective structured text; and third, the content of the data storage DA, which is the pseudo-code generated from the structured text. The data storage DA is in bidirectional connection with the MCC editor and the ST compiler, represented by the bidirectional information arrows 14 and 15.

Figure 3:
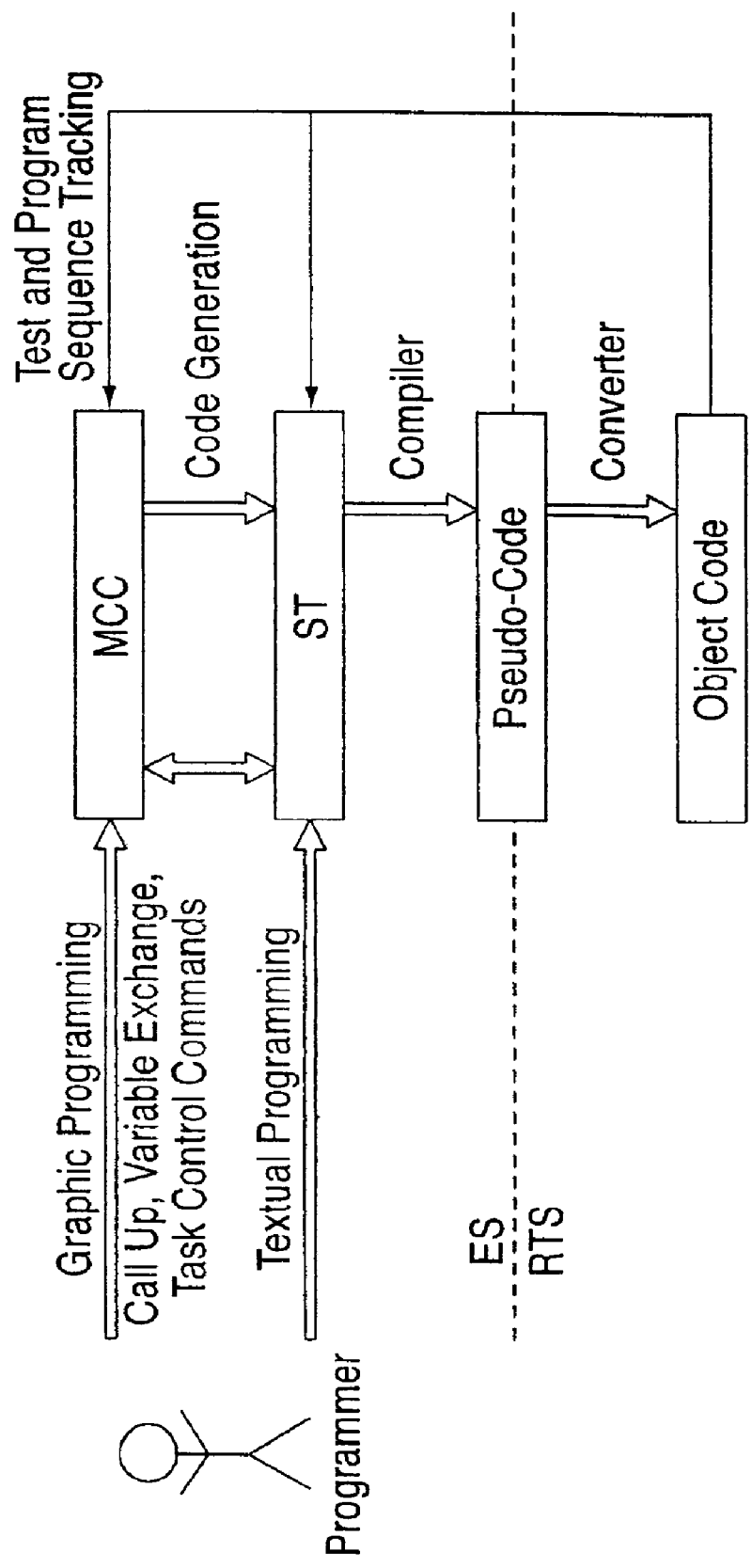
FIG. 3 shows the technical program relationship between elements of the engineering system and the run time system, also in the form of a survey diagram.

FIG. 3 shows the existing abstraction levels from the standpoint of the program code as a survey diagram. The different program code levels are illustrated as rectangles. The top level is the MCC level, where the flowchart programs are generated. The next lower code level is the structured text level ST. One reaches the ST level from the MCC level by a corresponding code generation as represented by an arrow from the MCC block to the ST block. Beneath the structured text level ST is the pseudo-code level. A processor-independent pseudo-code is converted by a converter from the structured text program, as represented by the arrow from the ST block to the block bearing the name "pseudo-code". Beneath the pseudo-code level is the lowest code level, namely, the object code level which contains the processor code that can be executed. The object code is generated from the pseudo-code by a converter, also represented by an arrow from the pseudo-code block to the object code block. Arrows bent at a right angle lead away from the object code level back to the structured text code level ST and to the flowchart level MCC. This indicates that test activities and program tracking activities can take place on these levels on the basis of the object code. The bold double arrow between the MCC level and the ST level indicates that calls, task control commands and variable exchange functions can be sent between these two levels. The dotted line in FIG. 3 shows the borderline between the engineering system ES and the run time system RTS of the controller (S; FIG. 2). This borderline runs through the pseudo-code level, and everything above the dotted line belongs to the engineering system ES, while everything below the dotted line belongs to the run time system RTS.

In addition, FIG. 3 shows how a programmer or a user (represented by a stylized stick figure at the left edge of the figure) can introduce entries into the engineering system ES. The user can generate flowcharts on the MCC level with the help of graphical programming, or generate programs on the structured text level ST by text programming. Both input options are represented by arrows leading from the stick figure to the MCC block or to the ST block.

Figure 4:
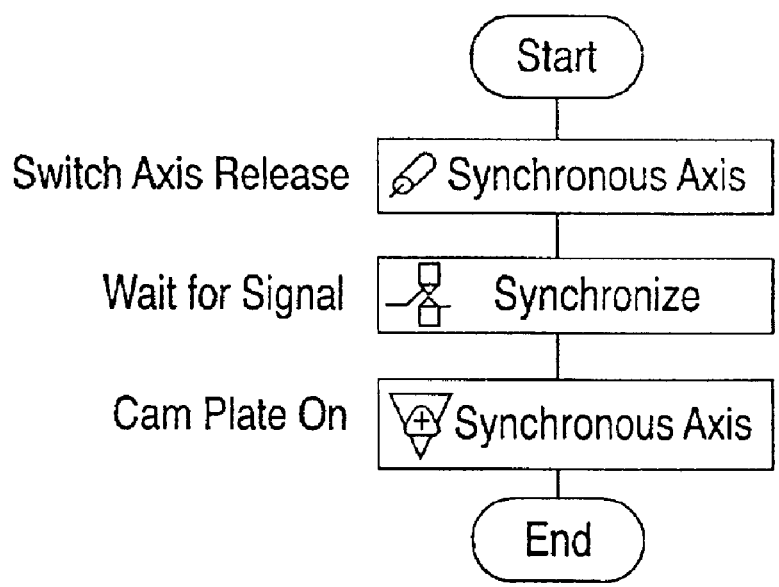
FIG. 4 shows a simple diagram in flowchart representation.

The diagram according to FIG. 4 shows a simple program sequence for programming axial motions. Each flowchart begins with a start node and ends with an end node. These program limiting symbols bear the designations "start" and "end," respectively. Start symbols and end symbols are each represented by a rectangle with the end faces designed as semicircles. The program commands are represented by rectangles which contain a written command and a graphical symbol representing the stored command.

The flowchart symbols are usually generated by using an input bar with the help of a mouse in the flowchart editor, but other input means such as a touch pad are also conceivable. Alternatively, the system might be operated by means of a keyboard, with or without a mouse.

As the default, the flowchart symbols are directed at one another by the flowchart editor and are linked together by a line.

A synchronous axis is enabled after the start, and then the system waits for a synchronization signal, and as the next and final command of the flowchart, a cam plate, is turned on for the synchronous axis. The command sequence of FIG. 4 is terminated by the end symbol.

Figure 5:
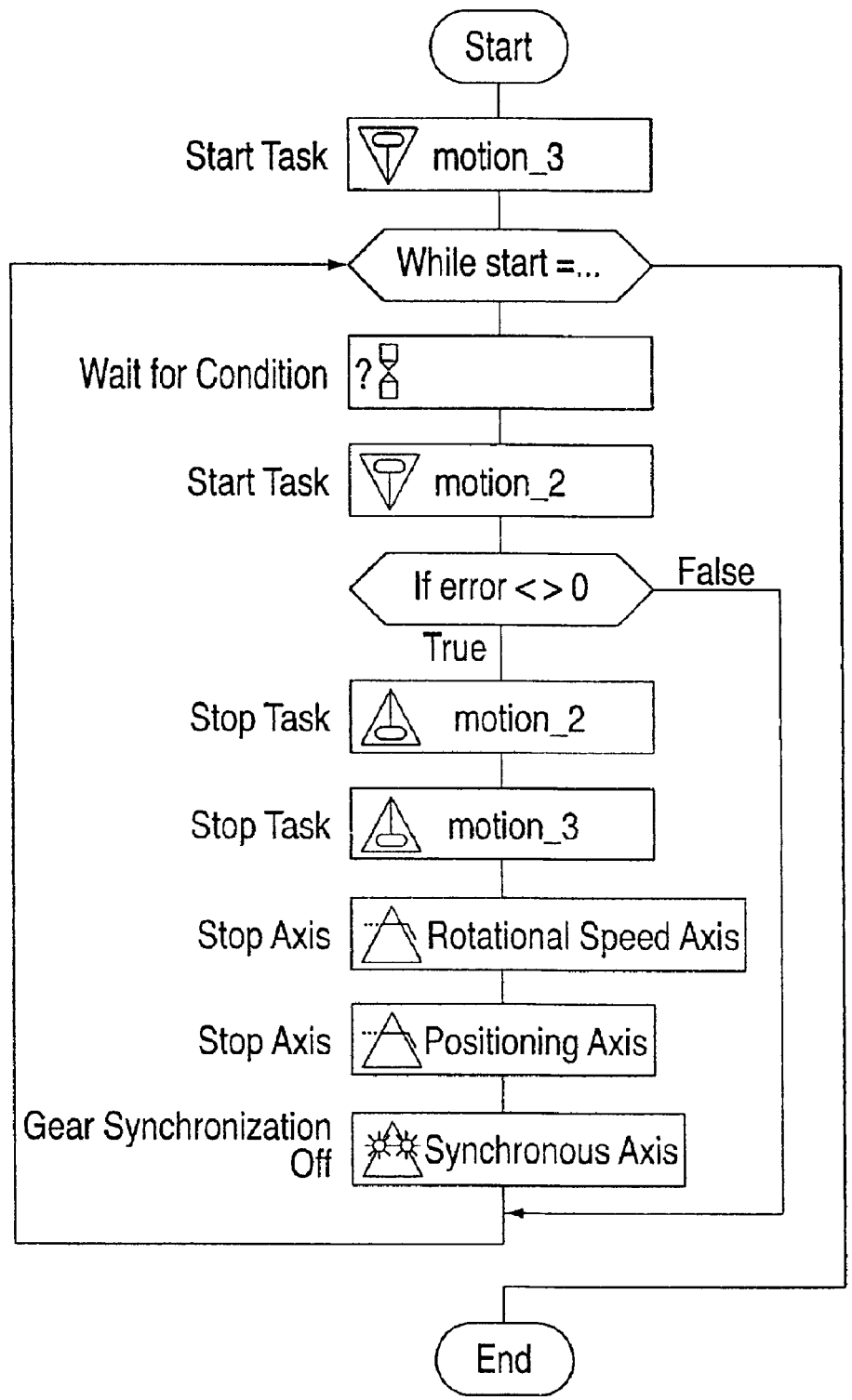
FIG. 5 shows a complex diagram in flowchart representation with the control structures WHILE and IF, FIG. 6 also shows a complex diagram in flowchart representation with the parallel branching (sync) language construct

The diagram of FIG. 5 shows a complex flowchart with control structures for a WHILE loop and for the IF statement. The WHILE and the IF statements are each represented by hexagonal honeycomb-shaped symbols. Otherwise, the same types of symbols as those already known from FIG. 4 are used in the program run as illustrated in FIG. 5. The flowchart begins with the start symbol and ends with the end symbol. Immediately after the start node, there is a command which starts the task "motion_3." This command is of the "start task" type. Therefore, the rectangle for this command also contains the respective corresponding symbol representing the starting of a task. The hexagonal honeycomb-shaped WHILE statement follows next in the program sequence. As long as the condition indicated in the WHILE statement is true, the commands following the WHILE statement are executed cyclically in succession. The end of the command sequence of a WHILE loop is represented by an angled arrow leading down from the last symbol of the WHILE statement (this is the command of the type "gear synchronization off" based on a synchronous axis) and leading back to the WHILE statement on the left side of the figure. If the condition in the WHILE statement is no longer met, then the command sequence belonging to the statement is no longer executed. This is illustrated by a rectangular connecting line leaving the WHILE symbol on the right side and bypassing the sequence of symbol commands belonging to the WHILE symbol on the right side and opening into the symbol directly following this command sequence, which is the end symbol.

However, if the WHILE condition is met, the following command sequence is processed: immediately after the WHILE statement follows a command which represents waiting for a condition. This command also contains a corresponding mnemonic graphical signal representing the waiting process graphically. This is followed by a command which starts the "motion_2" task. This command is also of the "start task" type and contains the corresponding graphical symbol. This command is followed by the IF statement, which is illustrated similarly to the WHILE statement by a hexagonal honeycomb-shaped symbol. If the IF condition is met (represented by "error < > zero"), then the command sequence is further processed in the true branch. Otherwise, if the condition is not met, the command sequence in the false branch is processed further. The next command in the true branch of the IF condition is a command that stops the "motion_2" task. This command is of the "stop task" type. It is followed by a command that stops the "motion_3" task. This command is also of the "stop task" type. These commands are also represented by respective corresponding symbols. Next in the command sequence are two "stop axis" commands. In the first such command, a rotational speed axis is stopped, and in the following command a positioning axis is stopped. These "stop axis" commands are also represented by corresponding graphical symbols. The next and last command relates to an axis with the name "synchronous axis", namely, the disconnection of the gear synchronization ("gear synchronization off"). The symbols of the flowchart are connected by lines, thus, representing the program sequence. An arrow bent at a right angle leads away from this command, representing the last command in the WHILE statement, and goes back to this WHILE statement. This represents the cyclic processing of the command sequence. In the WHILE statement, a check is performed to determine whether the condition is met. If it has been met or continues to be met, the command sequence is run once again. If it has not been met, the program leaves the WHILE statement and continues with the end symbol, i.e., the program run represented by the flowchart is ended.

Figure 6:
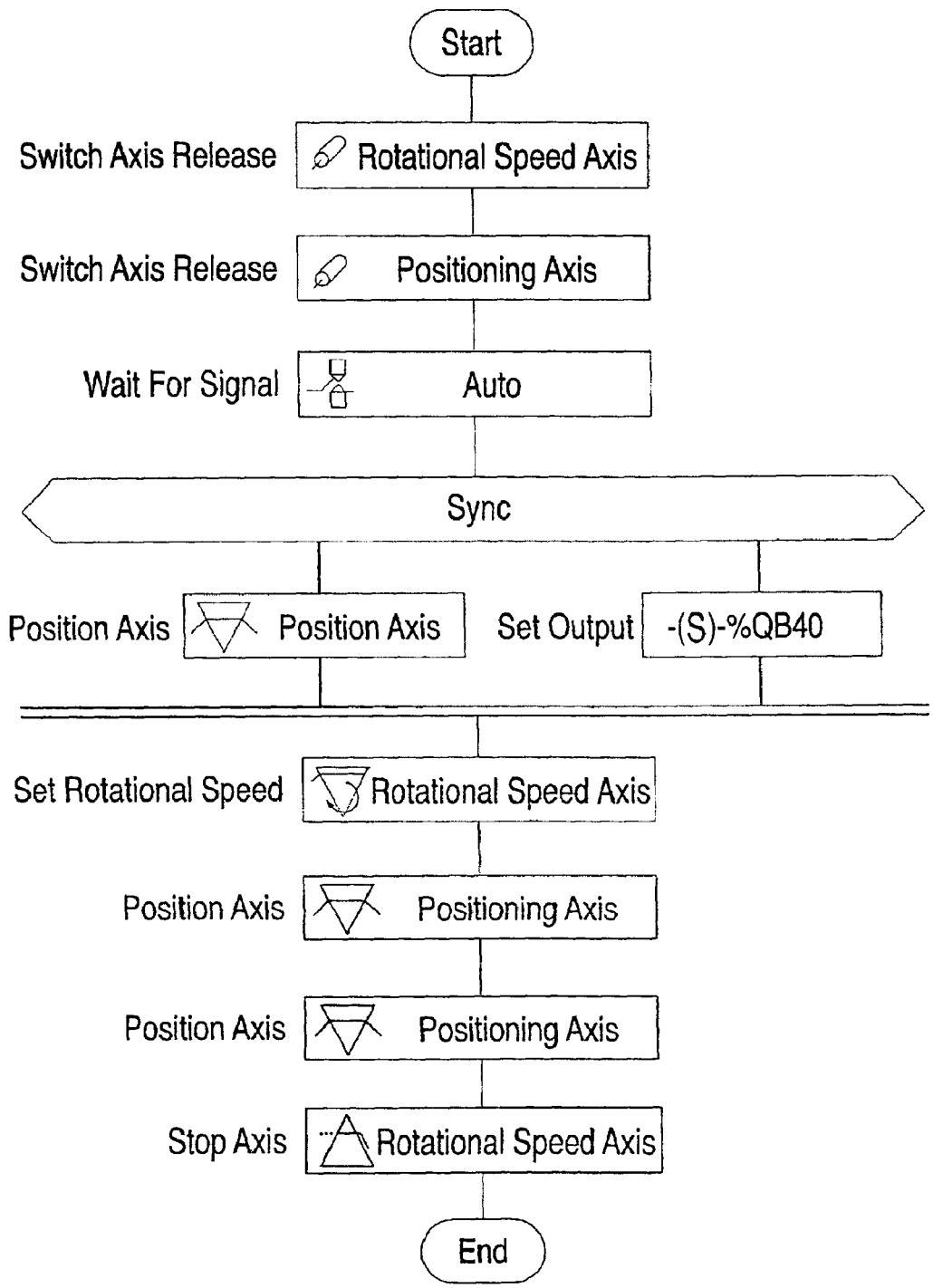

FIG. 6 shows a complex diagram in flowchart representation with the parallel branching language construction (sync). The start symbol is followed by a command that relates to a rotational speed axis, namely, "switch axis release." For this command, a graphical symbol representing this command is also shown in the command rectangle. This is again followed by a command of the type "switch axis release", but this time it relates to a positioning axis; here again, the respective corresponding symbol is given. The following command is a synchronization command "wait for signal", designated as "auto" and provided with the corresponding symbol. The symbol for the parallel branch (sync) follows as the next symbol. This symbol, like the WHILE and the IF statements, is also represented by a hexagonal honeycomb-shaped graphical element. All the commands arranged in the sector directly beneath the symbol for the parallel branch start in the same interpolator cycle. This includes the "position axis" command, based on a positioning axis (this type of command also includes the respective corresponding graphical symbol) and a command of the "set output" type. The "set output" type of command is also illustrated by a rectangle, this rectangle containing the address of the output (% QB40) and the corresponding symbol for this set command (S stands for set). The commands belonging to a parallel branch symbol, that is, the commands that start within the same interpolator cycle, are connected with a line upward to the parallel branch symbol and at the bottom they are connected by a double line.

This horizontal double line indicates that parallel processing has been stopped again and a program will wait to process the following command until all the actions in the parallel branch are concluded. Thus, this is also the end symbol of the parallel branch construction. This is followed next by a command of the "rotational speed set-point" type, which relates to a rotational speed axis. This is followed by two commands of the "position axis" type, each based on positioning axes. This is again followed by a command of the "stop axis" type, which relates to a rotational speed axis. The rectangle representing these commands, also contains the corresponding respective graphical symbols. After a command of the "stop axis-type which relates to the aforementioned rotational speed axis, follows the end symbol.

The type of flowchart programming shown here supports different types of programming. First, a more or less true parallelism is achieved through the parallel branch symbol with the start of the respective commands in an interpolator cycle, that is, programming of parallel threads is supported and the respective processing is enabled. Secondly, cyclic programming and cyclic program processing is supported. This means that it is possible to show that only successive commands are initiated, and that it is not necessary to wait for processing of the preceding command. It would also be possible to program and illustrate such sequential processes, namely, on initiation of a command to wait for processing of this command until the next command is initiated and processed. The flowchart programming presented here is, thus, flexible in the way it can be applied by a user and used for different applications.

Figure 7:
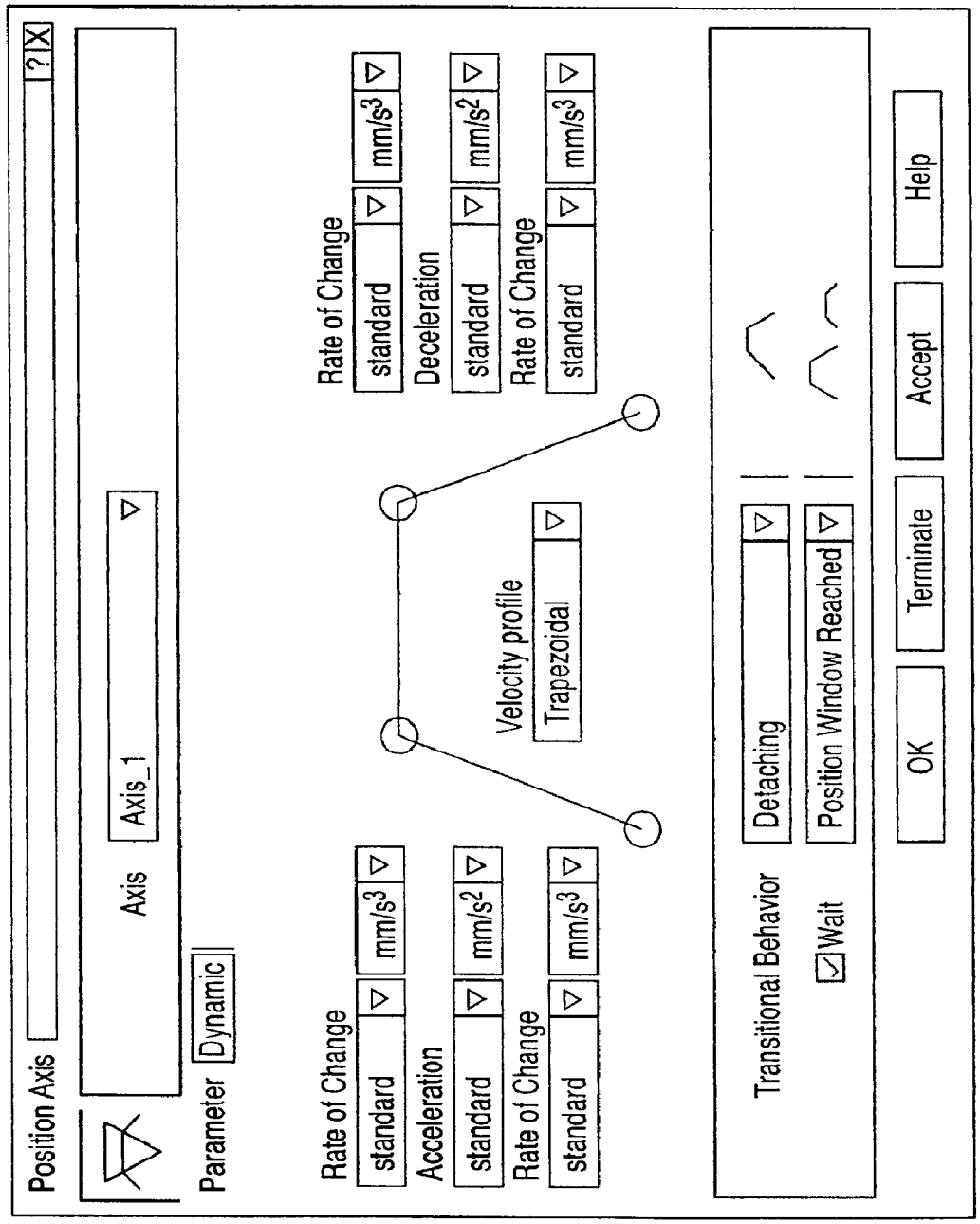
FIG. 7 shows a mask for setting parameters for the command "position axis,"

FIG. 7 shows a mask for setting parameters for the "position axis" flowchart command. The designation of the corresponding command, namely, "position axis" in this case, is located in the upper left of the upper bar of the mask. The upper bar also contains two switches on its right side. The switch with a question mark provides online help, and the second switch (which is labeled with an x) is used for closing the mask. The mask with which parameters are set (the parameterization mask) includes different input sectors. In the top input sector, the corresponding axis can be selected. With the help of an input menu (represented by an input button with a small, upside-down triangle), the corresponding axes can be selected in the input window. At the upper left of this top sector is the graphical symbol belonging to this command, an upside-down triangle with a dark horizontal line at the center, and other small lines angled downward at each end of this line. The next and largest sector of the parameterization mask represents the possibility of parameter input. The parameters differ according to the command. They are sorted logically by means of task bar options which are arranged on a task bar, as is customary in the conventional program interfaces. The first page (in FIG. 7 this page can be shown by selecting the task bar option "parameter") usually contains the parameters which absolutely must be indicated for setting of parameters of the command. An unconditional parameter for the "position axis" command would be, for example, the target position of an axial motion.

The number and significance of the task bar options also varies according to the command. It can be seen in FIG. 7 that a "dynamic" task bar option is also present for the "position axis" command in addition to the "parameter" task bar option. With this task bar option, entries regarding the rate of change and acceleration as well as the velocity profile can be made for the description of the dynamic behavior. These inputs can be made through input fields and the respective menus. In this case, the trapezoidal shape was selected as the velocity profile. This shape has also been represented graphically in a stylized manner at the center of this input sector. In the lower input sector of the parameterization mask which follows this, additional inputs, e.g., for the transitional behavior, can be made. In this case, "detaching" was entered for the transitional behavior. In addition, waiting conditions can be entered by putting a check in the "wait" box. Additional entries for this synchronization can be made in a respective input window. In the example in FIG. 7, "position window reached" has been entered for this item. The entries are also supported by axial profiles which are represented in a stylized manner. The lower end of the parameterization axis consists of four input buttons, namely, an "okay" button, a "terminate" button, an "accept" button and a "help" button. By using these input buttons, users may either accept the entries, confirm them, discard them or call up input help. With the help of the waiting conditions, so-called step enabling conditions can be specified by a user to synchronize the functions (e.g., reference point approach or axial positioning) or their interaction.

There are particular parameterization masks for commands that can be entered and processed with the help of the flowchart editor. Thus, the user is supported in programming motion and control sequences with the help of these parameterization masks in a context sensitive manner.

Figure 8:
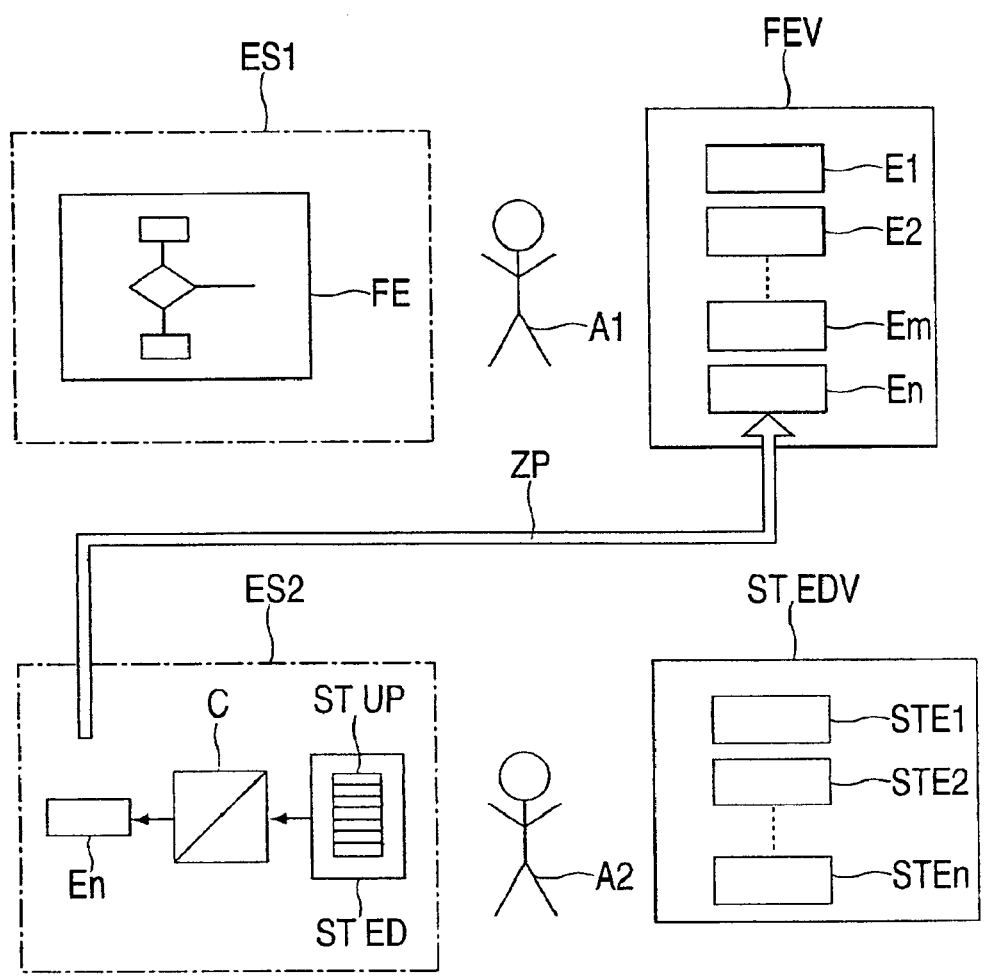
FIG. 8 shows in a survey diagram how the library of icons of the flowchart editor is expanded.

FIG. 8 shows in a survey diagram how the flowchart editor library of icons FEV of the flowchart editor FE is expanded. At the outset, the graphical elements E1 to Em of flowchart editor FE are available to the user A1 (represented by a stick figure). The flowchart editor FE is represented as a rectangle containing the graphical elements indicated at the upper left of the figure. The flowchart editor FE is part of an engineering system ES1, represented by a dotted line. The engineering system ES1 also contains other elements, but, for simplicity, these are not shown here. The library of icons FEV of the flowchart editor FE, which contains the graphical elements E1 to Em at the outset, is shown as a rectangle at the upper right of the figure.

The lower half of FIG. 8 shows a user A2 (also represented by a stick figure) who is working with an engineering system ES2 on the structured text level (ST; FIG. 3). At the structured text level, the structured textual language elements STE1 through STEn representing the structured text library of icons STEDV of the structured text editor are available to the user A2 within the structured text editor STED. The structured text library of icons STEDV of the structured text editor STED is also represented as a rectangle. With the help of the structured text language elements STE1 through STEn, the user A2 can create structured text subprograms STUP in the structured text editor STED. These subprograms STUP are converted to graphical language elements of the flowchart editor FE by a converter (e.g., a compiler C.)

The lower left section of FIG. 8 shows in diagram form how these graphical elements are generated. The conversion takes place within the engineering system ES2 as an example. The structured text subprogram STUP (indicated schematically by a sequence of structured text elements from the library of icons STEDV of the structured text editor) is converted by the compiler C (represented by a rectangle with a diagonal line) to the graphical element En, which also contains the function interface of the original structured text subprogram. The conversion process (structured text editor| compiler| graphical element) is indicated schematically by two horizontal arrows. The allocation arrow ZP indicates that the newly generated graphical element En expands the library of icons FEV of the flowchart editor FE and is available to the user A1 for flowchart programming.

The engineering system ES2 also contains additional elements, but, for simplicity, these are not shown. In the mechanism described here, functions of the engineering systems ES1 and ES2 may be contained in a single engineering system. The two users A1 and A2 may also be represented by a single person.

Figure 9:
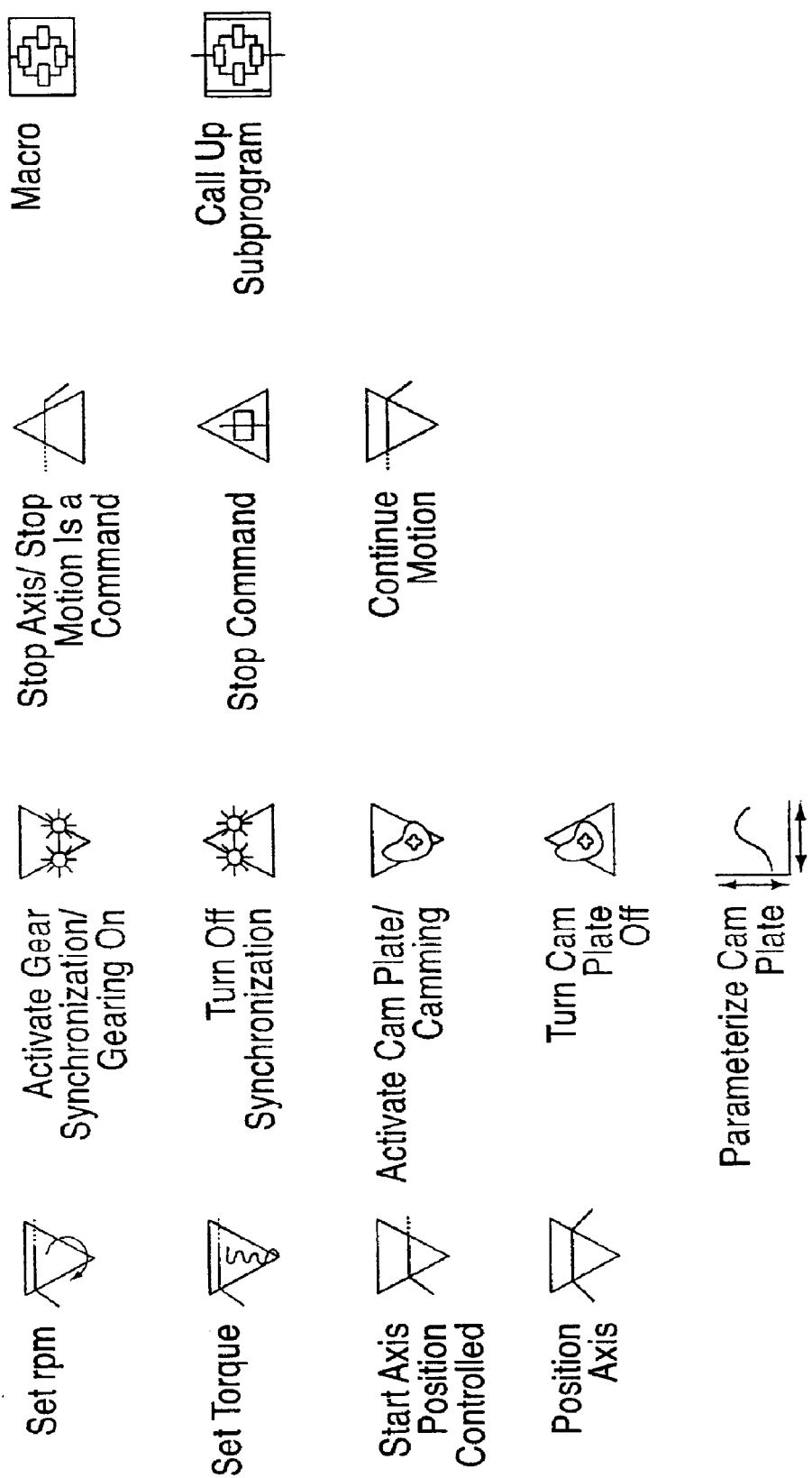
FIG. 9 shows a selection of language elements (icons) of the flowchart editor.

The diagram according to FIG. 9 shows a selection of language elements (icons) of the flowchart editor. These language elements represent commands that can be used for graphical programming using the flowchart editor. The motion control flowchart editor supports the following classes of commands and makes available appropriate symbols for the individual commands of the following classes: start commands, stop commands, positioning commands, synchronous and cam plate commands, probe commands, and software cam commands, wait commands, task control commands, commands for manipulation of variables and other general commands. In addition, the motion control flowchart editor makes available additional graphical control structures for the graphical program execution.

What is claimed is:

1. A method for programming motion controllers, wherein graphical elements, comprising control structures and function blocks, are linked using a graphical editor to form a motion control flowchart represented on a display device, comprising the steps of:
   providing a plurality of structured text subprograms;
   converting the structured text subprograms to a plurality of corresponding graphical elements comprising function interfaces corresponding to the respective structured text subprogram at least one programming language command selected from the group consisting of loop and parallel branch programming language commands is provided in motion control flowchart notation and wherein
   a parallel branch is provided and individual commands are initiated in a given interpolator cycle within respective parallel branches.

2. The method according to claim 1, further comprising the steps of:
   a) generating a structured textual language from the flowchart,
   b) converting the structural textual language in a processor-independent pseudo-code,
   c) loading the processor-independent pseudo-code into the controller,
   d) converting the processor-independent pseudo-code into executable processor code.

3. The method according to claim 1, wherein programming language commands are provided in the flowchart editor as a function of the associated hardware configuration.

4. The method according to claim 1, wherein the graphical elements are provided as programming language elements of the motion control flowchart.

5. The method according to claim 1, wherein the structured text subprograms comprise structured text according to IEC 6-1131.

6. The method according to claim 5, further comprising the step of switching between three forms of representation, the forms selected from the set consisting of structured textual language, contact plan and function plan.

7. The method according to claim 1, wherein at least one programming language command selected from the group consisting of loop and parallel branch programming language commands is provided in motion control flowchart notation.

8. The method according to claim 7, wherein a parallel branch is provided and individual commands are initiated in a given interpolator cycle within respective parallel branches.

9. The method according to claim 1, wherein parameters are set for the function blocks via a mask input in motion control flowchart notation.

10. The method according to claim 1, comprising the further steps of combining function blocks into modules, and representing the modules as function blocks in motion control flowchart notation.

11. The method according to claim 10, modules are interleaved in motion control flowchart notation.

12. The method according to claim 1, further comprising the step of assigning, in motion control flowchart notation, multiple variables in function blocks.

13. The method according to claim 1, wherein function blocks that represent functions requiring a period of time, comprise step-enabling conditions in motion control flowchart notation.

14. The method according to claim 1, wherein the graphic elements of the flowchart are positioned automatically.

15. The method according to claim 1, wherein the graphic elements of the flowchart are linked together automatically.

16. The method according to claim 1, wherein the flowchart is displayed in a form comprising one form selected from the group consisting of an enlarged form and a reduced form:

17. The method according to claim 1, wherein recompiling in motion control flowchart notation is possible by means of marks in the textual language.

18. The method according to claim 1, wherein the text subprograms are provided by third parties and the conversion to graphical elements is performed automatically.

19. The method according to claim 1, wherein the conversion is performed by a compiler.

20. A method for programming motion controllers, wherein graphical elements, comprising control structures and function blocks, are linked using a graphical editor to form a motion control flowchart represented on a display device, comprising the steps of:

provisioning a plurality of structured text subprograms; and converting the structured text subprograms to a plurality of corresponding graphical elements comprising function interfaces corresponding to the respective structured text subprogram, wherein at least one programming language command selected from the group consisting of loop and parallel branch programming language commands is provided in motion control flowchart notation and wherein a parallel branch is provided and individual commands are initiated ins given interpolator cycle within respective parallel branches.

21. A method for programming motion controllers, comprising:

providing a flowchart editor;

linking graphical elements by use of the flowchart editor to form a flowchart; and generating graphical elements from user-defined textual subprograms by a converter, the generated graphical elements comprising function interfaces for the corresponding textual subprograms, and are adapted to expand the library of the flowchart editor with corresponding icons, a parallel branch is provided and individual commands are initiated in a given interpolator cycle within respective parallel branches.

\* \* \* \* \*